United States Patent [19]
Burtis

[11] Patent Number: 5,305,721
[45] Date of Patent: Apr. 26, 1994

[54] ROTARY WANKEL TYPE ENGINE

[76] Inventor: Wilson A. Burtis, 5011 Harvard Ave., Westminster, Calif. 92683

[21] Appl. No.: 6,968

[22] Filed: Jan. 21, 1993

Related U.S. Application Data

[60] Division of Ser. No. 561,924, Aug. 1, 1990, Pat. No. 5,203,307, which is a continuation-in-part of Ser. No. 373,231, Jun. 29, 1989, abandoned.

[51] Int. Cl.$^5$ ............................................. F02B 53/00
[52] U.S. Cl. ................................. 123/205; 123/211; 123/218
[58] Field of Search ............... 123/218, 205, 242, 211

[56] References Cited

U.S. PATENT DOCUMENTS 3,228,183  1/1966  Feller .............................. 123/205 X
5,022,366  6/1991  Abraham et al. .................... 123/205

FOREIGN PATENT DOCUMENTS 2630805  1/1978  Fed. Rep. of Germany ...... 123/242
  64517  5/1977  Japan ................................. 123/242
 190624  9/1985  Japan ................................. 123/218

Primary Examiner—Michael Koczo
Attorney, Agent, or Firm—Knobbe, Martens, Olson & Bear

[57] ABSTRACT

A rotary Wankel type engine system is disclosed, wherein the crankshaft is supported by a center main roller bearing. The rotor apexes are sealed by two piece apex seals and by side seals. The engine system further includes an oiling system which permits oil flow through the center bearing and through lubrication passages in the engine rotor to provide a means for cooling the engine rotor under high loading conditions. Riblets are defined in the combustion face of the rotor to promote aerodynamic lateral stratified charge control to minimize atomized fuel charge loss to surface wetting before ignition.

14 Claims, 5 Drawing Sheets

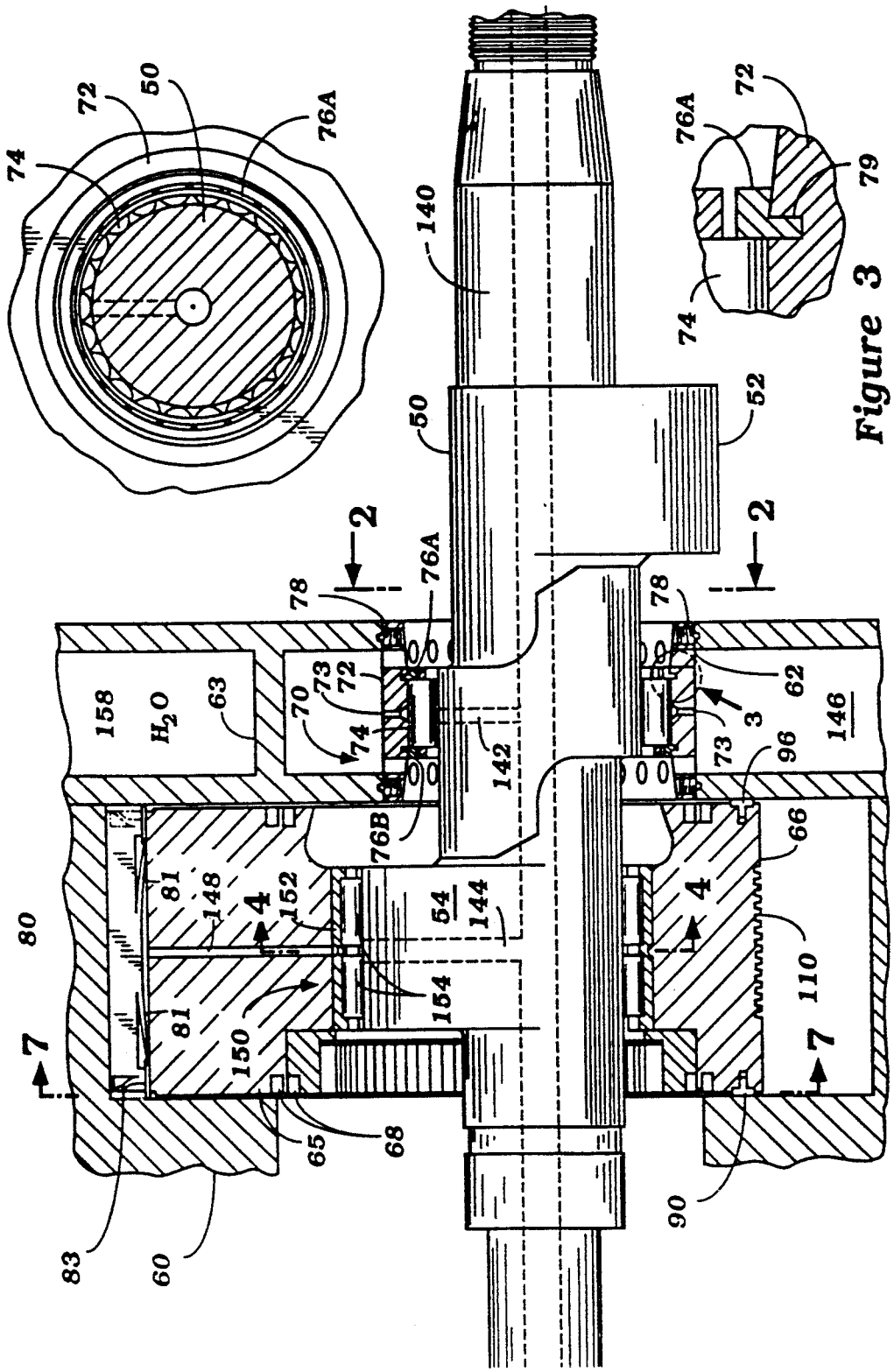

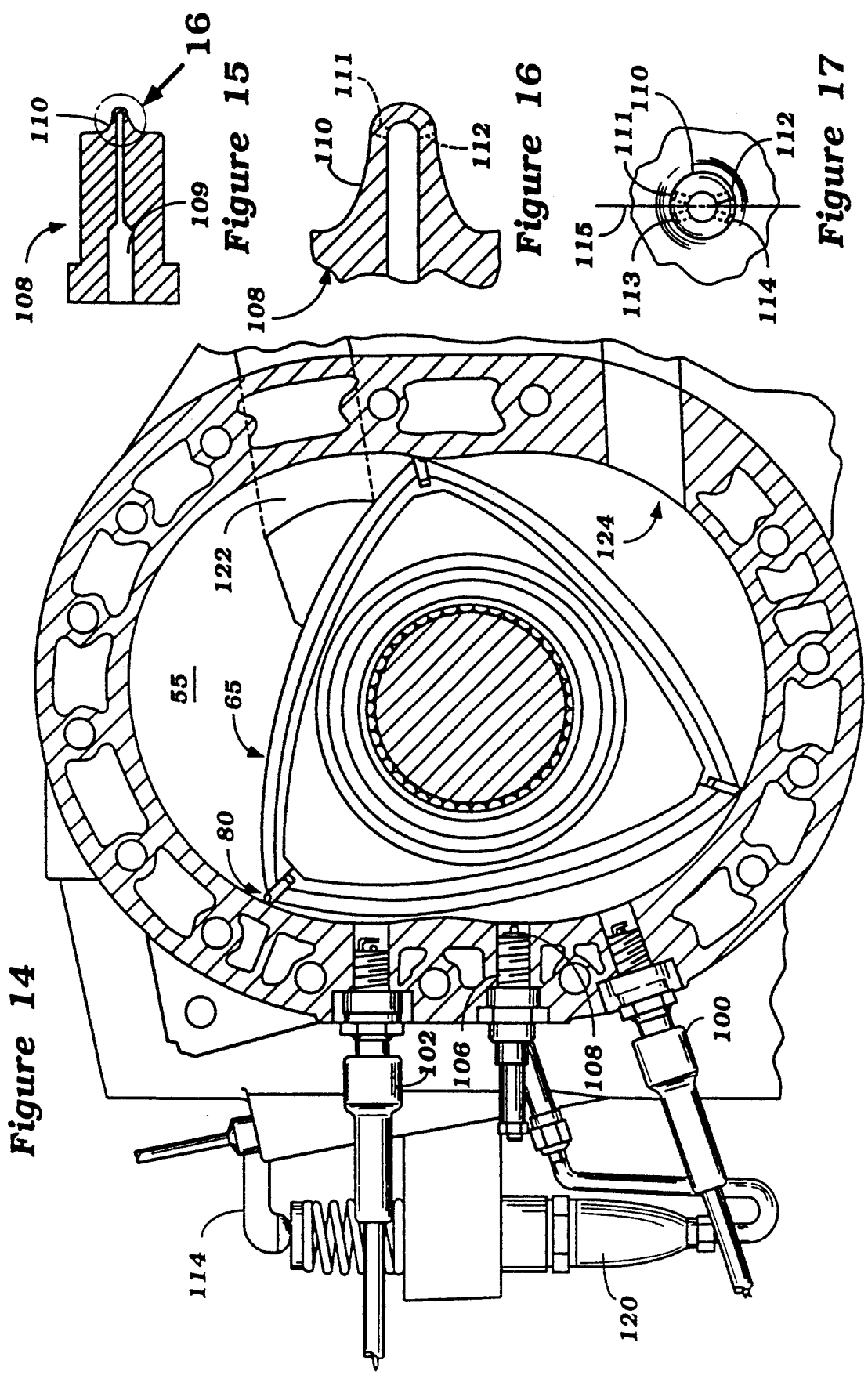

ROTARY WANKEL TYPE ENGINE

This is a division of U.S. patent application Ser. No. 561,924, filed Aug. 1, 1990, U.S. Pat. No. 5,203,307, which is a continuation-in-part of application Ser. No. 07/373,231, filed Jun. 29, 1989, now abandoned.

BACKGROUND OF THE INVENTION

The present invention relates to rotary Wankel type engines, and more particularly to such an engine which provides improved operation in the form of improved fuel charging.

Exemplary rotary type engines are shown in U.S. Pat. Nos. 3,996,898; 3,694,113; 3,228,183; and 3,259,115, and in German (Democratic Republic) patent document no. 26759.

Rotary Wankel type engine systems known in the art suffer from various drawbacks which have prevented such systems from achieving maximum engine performance and reliability. Such problems include high leakage of the rotor apex and side seals, causing overheating and lubrication contamination, and crankshaft bending for lack of a sufficient center main bearing support, causing side housing gouging and limiting maximum engine RPM under high compression firing loads.

The German patent document no. 26759 (Straube) illustrates a sealing arrangement apparently used in a rotary engine. This arrangement does not appear to provide an effective end seal in contact with the side seals. It also appears that the side seals restrict movement of the apex seals; the side seals will tend to jamb against the apex seals from the effects of rotation of the rotor.

U.S. Pat. No. 3,228,183 discloses a rotary internal combustion engine which is apparently a two stage diesel type engine. While the reference discloses two spark plugs, fuel is not injected laterally between the sparkplugs for stratified area charge. Moreover, the spark plugs are not equally spaced from the injectors, and therefore the system does not provide maximum stratification.

U.S. Pat. Nos. 3,259,115 and 3,694,113 describe rotary engine designs which employ a crankshaft supported by split journal type bearing assemblies. A disadvantage of such bearing assemblies is that they fail to provide adequate lubrication flow to the crankshaft and engine components, due to the relatively tight tolerance fit of the bearing journals around the crankshaft.

U.S. Pat. No. 3,996,898 describes an apex seal arrangement for a rotary engine. The dual apex seals do not seal at the side walls laterally. Separate corner seal elements are employed.

It would therefore represent an advance in the art to provide an improved rotary Wankel type engine system with improved apex and side sealing, and with improved center support bearing means for proper support of the crankshaft during high RPM loading.

SUMMARY OF THE INVENTION

Improved fuel stratification and reduction in rotor surface fuel wetting is achieved by a plurality of parallel riblets formed in the combustion side surfaces of the rotor. The riblets provide a means for aerodynamically laterally accelerating the fuel mixture on the combustion face of the rotor for increased fuel stratification before firing.

In accordance with another aspect of the invention, improved fuel distribution and stratification is achieved through direct fuel injection via an injector disposed between first and second spark plugs in the operating chamber of the engine. Injector spray tip orifices direct the atomized fuel in the direction of each spark plug, so that upon firing flame fronts extend in both directions from the injector, resulting in maximum usage of the pressure buildup after firing to maximize the engine crankage.

BRIEF DESCRIPTION OF THE DRAWINGS

These and other features and advantages of the present invention will become more apparent from the following detailed description of an exemplary embodiment thereof, as illustrated in the accompanying drawings, in which:

FIG. 1 is an engine longitudinal cross sectional view of the crankshaft assembly with the center main roller bearing anchored to the center housing, dual apex seal mounted in the rotor with side seals, the rotor with its roller bearing, and showing the rotor riblets.

FIG. 2 is an end view of the center main roller bearing taken on the line 2—2 of FIG. 1.

FIG. 3 is a cross sectional view of one of two bearing roller retainer snap rings for assembly of the roller bearing and crankshaft in the center housing.

FIG. 14 is a lateral cross section view showing the rotor and trochoid rotor housing, the pintle-type direct fuel injection system mounted between the dual ignition spark plugs for two areas of fuel ignition, a high pressure injector pump for automatic variable throttle advanced timed operation, and a cam rockerarm to operate the fuel injection pump.

FIGS. 15–17 illustrate the spray tip of the fuel injector.

DETAILED DESCRIPTION OF THE PREFERRED EMBODIMENT

Figure 4:
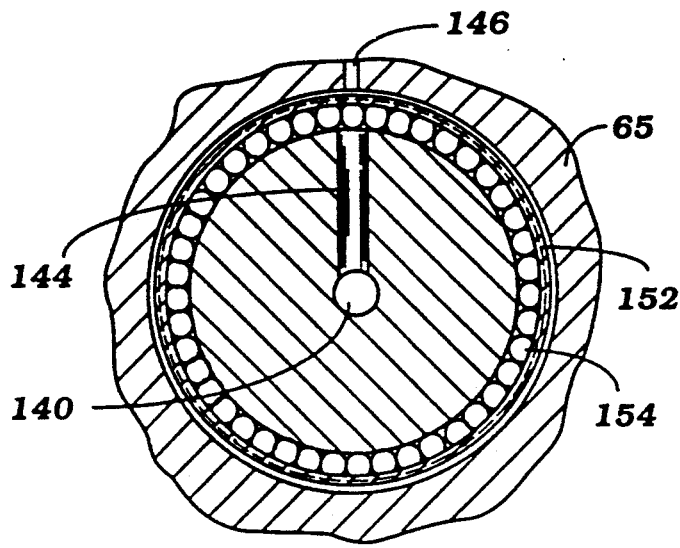
FIG. 4 is a cross sectional view of the rotor roller bearing taken on the line 4—4 of FIG. 1.

The present invention will be described with respect to a two rotor rotary engine system, although it will be recognized that the invention may be used in other configurations.

FIG. 1 is a broken-away, partial cross-sectional view showing the engine crankshaft 50 and the center housing 60, with one rotor 65. The other rotor is identical to the illustrated rotor, and is omitted with its associated housing to avoid cluttering the description of the invention with unnecessary detail.

In accordance with the invention the crankshaft 50 is supported by a center main roller bearing 70 disposed between the rotors, and comprising the one-piece outer race 72, bearing rollers 74 and roller retainer snap rings 76. The center main bearing 70 supports the crankshaft 50 between the two crankshaft lobes 52 and 54. The outer race 72 is a one piece member, press-fit into and secured to the housing bearing journal 62 by a plurality of threaded fasteners 78. The inside edges of the outer race 72 are fabricated with a chamfer, on the order of 5%, for crankshaft clearance during assembly of the bearing and crankshaft. To assemble the bearing 70 and crankshaft 50 into the configuration shown in FIG. 1, the crankshaft 50 is threaded through the empty race 72, the inner diameter of the race 72 being larger than the cross sectional shaft lobe dimension. Thereafter, the bearing rollers 74 supported in two roller cages of semicircular cross-sectional configuration are assembled into the race 72 and on the crankshaft 50, and secured in position by the retainer snap rings 76A and 76B.

FIG. 2 is a cross sectional end view of the center main bearing 70, showing the rollers 74, the bearing race 72 and the snap ring 76A.

FIG. 3 is an enlarged view of the area within the phantom circle "3" in FIG. 1, showing the snap ring 76B interlocking with a grove 79 formed in the outer bearing race 72.

Figure 5:
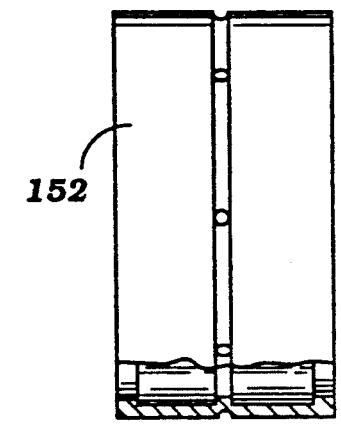
FIG. 5 is a side view of the rotor roller bearing.

The rotor 65 is mounted on lobe 54 of the crankshaft 50 by a conventional dual roller (caged roller) bearing 150, shown in more detail in FIGS. 4 and 5. This bearing 150 arrangement differs from the conventional journal rotor bearing, and permits oil to flow from the main oil passageway 140 in the crankshaft through the bearing 150 to the rotor oil passageway 144, as will be described in more detail below. The bearing 150 includes the outer bearing race 152 (FIG. 5) and a plurality of roller bearing 154. The race 152 is press-fitted into the center opening of the rotor 65. Minute burs on the race 152 self-lock the race in place in the rotor.

In a preferred embodiment, the rotor 65 is fabricated from aluminum. Conventional rotary engines have been unable to use aluminum rotors because the engines did not include an effective means for preventing rotor overheating. The aluminum rotor of the preferred embodiment is first "de-fuzzed" to remove the surface feather finish remaining after the machining process to form the rotor, and thereafter is processed using a Sanford process to provide a sapphire-hard exterior surface of the rotor. The process involves treating the outer surface of the rotor so that it becomes aluminum oxide to a depth of about 0.007 to about 0.010 inches and provides a hard anodized surface finish. The resulting surface finish results in a rotor which provides anti-seize properties in the present application. The Sanford process is well known to those skilled in the metallurgy arts.

The engine housing within which the rotor moves is fabricated of cast iron with a thin steel lining of about 1/32 inch in thickness. The engine housing is conventional in this sense. With its hard-anodized surface, the rotor has anti-seize capabilities when rotating within this engine housing.

Figure 6:
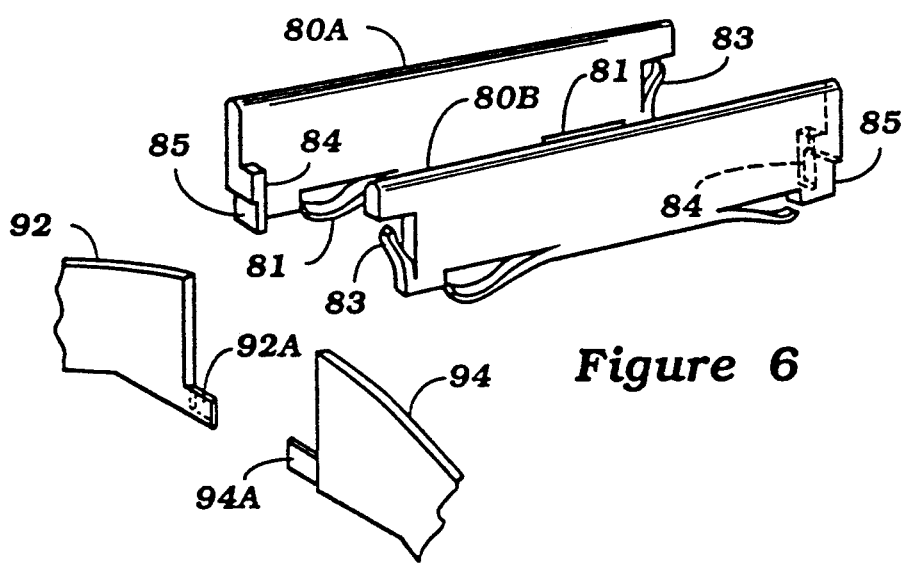
FIG. 6 is an exploded perspective view of the apex seals and the side seals.
Figure 7:
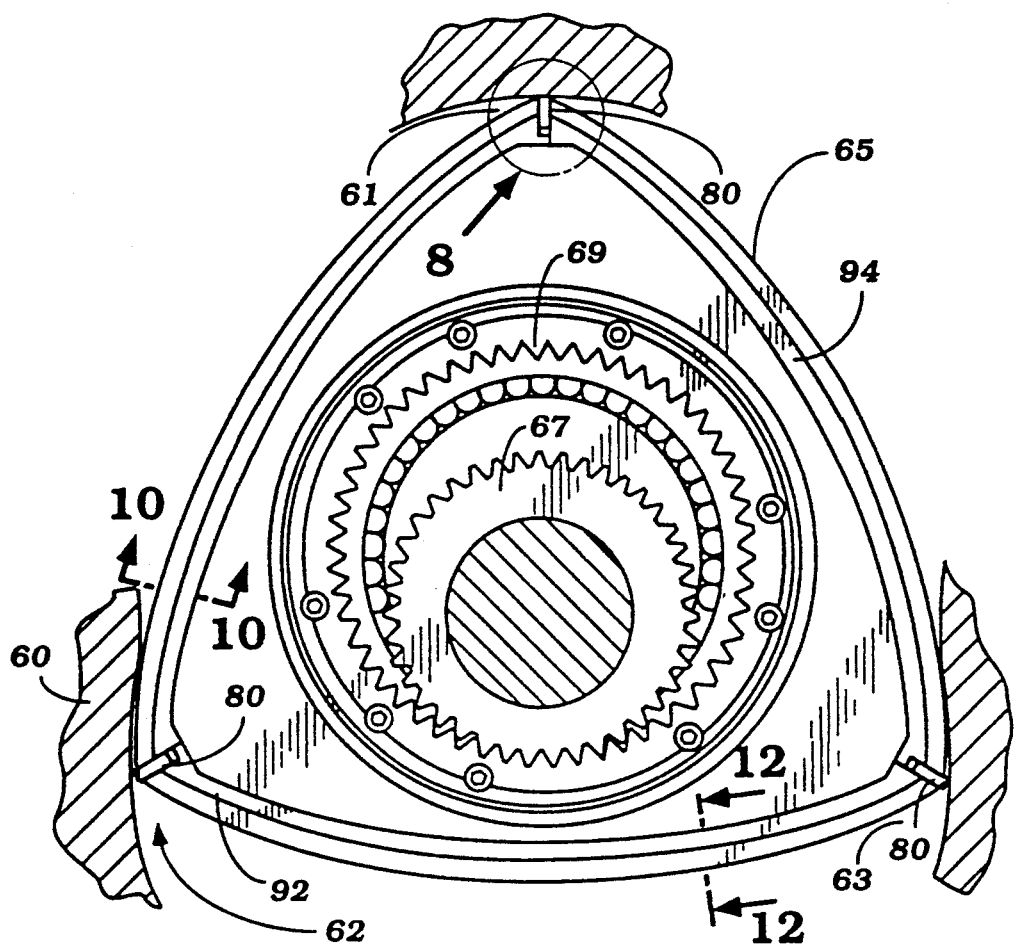
FIG. 7 is a cross sectional end view taken on the line 7—7 of FIG. 1 of the rotor with the apex seals, continuous ring side seals, rotor roller bearing and the rotor timing gears.

In the conventional manner, the rotor 65 is formed with three apexes 61, 62 and 63 (FIG. 7). The function of apex rotor sealing is performed by the dual apex seal unit 80 comprising apex seal elements 80A and 80B (FIG. 6). The seal elements 80A and 80B are fabricated from a chrome steel material, wherein a chrome coating is applied to the steel seal by a vacuum vapor process. Each seal element 80A and 80B is fabricated with spring elements to provide lateral and diametric loading of the seals against the rotor housing 60. The springs 81 comprising the seal 80 bear against the rotor apex to load the seal diametrically against the housing 60. The springs 83 comprising one seal element bear against the protruding shoulder 84 of the other seal element to provide lateral loading of the seal elements 80A and 80B.

While the spring elements 81 and 83 of the seal elements 80A and 80B are depicted in the figures as being integrally formed with the seal elements, it will be appreciated that separate spring elements may be employed, which are secured into bores formed in the seal elements. This would allow broken spring elements to be replaced, without requiring replacement of the entire seal element.

Overlapping side seals 90, 92 and 94 (FIG. 7) form a ring on one side surface of the rotor 65 which provides further lateral sealing in conjunction with the apex seals 80. A second set of side surface seals 96, 98 and 100 overlap to provide side sealing on the other side of the rotor 65. The seals 90, 92 and 94 extend along the lateral side peripheral surface of the rotor 65, and are fabricated from chrome steel, i.e., the same type of material from which conventional reciprocating engine piston rings are typically made. Each side seal includes an end tab, e.g., tab 92A of seal 92, of reduced thickness which overlaps a corresponding end tab of the adjacent side seal, e.g., tab 94A of seal 94, as illustrated in FIG. 6. The overlapping tabs fit against an external shoulder surface 85 of one of the seal elements (FIG. 6).

Figure 8:
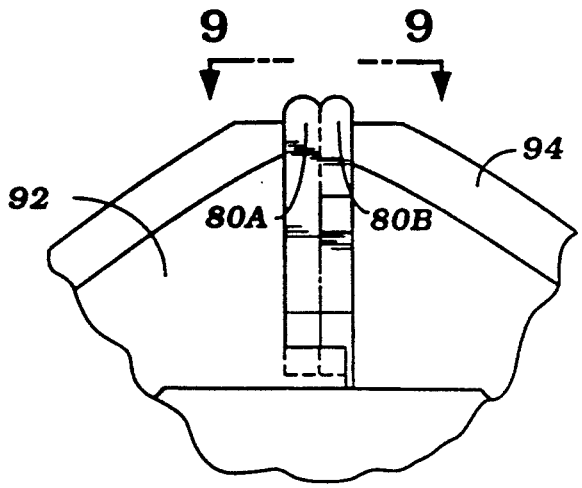
FIG. 8 is a cross sectional end view of the dual apex seals in combination with the side seals, taken within the phantom circle 8 of FIG. 7.
Figure 9:
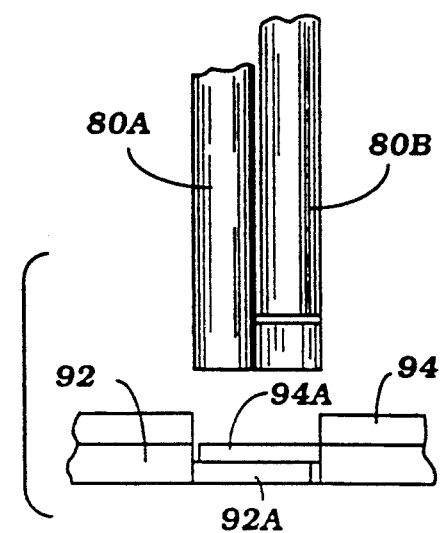
FIG. 9 is a top view, in relation to line 9—9 of FIG. 8, of the dual apex seals and the side seals in combination to show one sealing reference to the other.

FIGS. 8 and 9 illustrate the apex and side seal arrangement in further detail. FIG. 8 is an enlarged partial cross sectional end view, showing the area within the phantom circle "8" in FIG. 7. FIG. 9 is a top view in relation to line 9—9 of FIG. 8. The seal elements of each apex seal fit into a deep groove formed in the rotor along the apex. The seal elements 80A and 80B move diametrically with respect to each other as the rotor 65 is rotating within the toroidal engine operating chamber. Lubrication facilitating such relative movement is provided from inside the rotor 65 by a novel lubrication system described below.

Figure 10:
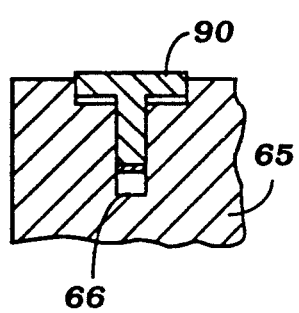
FIG. 10 is a cross section of the rotor side ring seal taken on the line 10—10 of FIG. 7.

FIG. 10 is a side cross sectional view taken along line 10—10 of FIG. 7, showing a typical side seal 90 and its interrelationship with the side of the rotor 65. The side seal 90 has a "T" shaped cross sectional configuration, and is fitted into a grove 66 in the side of the rotor 65 which forms a corresponding "T" shaped indentation in the rotor wall.

Figure 11:
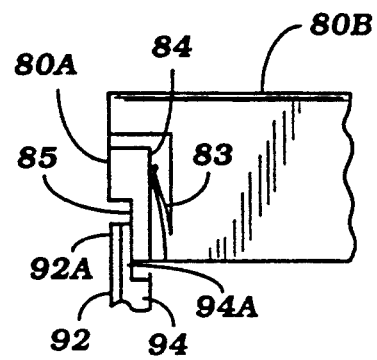
FIG. 11 is a view showing the interaction of the dual apex seals with the rotor side seals.

FIG. 11 is a further cross sectional view showing the lateral spring biasing of the apex seal element 80B against the shoulder 84 of the seal element 80A, and the manner in which the external shoulder 85 of the apex seal 80A bears against the overlapped tab elements 92A and 94A of the side seal elements 92 and 94.

Oil sealing between the rotor 65 and engine housing 60 is further provided by conventional oil seals 68 (FIG. 1).

The rotor timing gears 67 and 69 are visible in FIG. 7. These timing gears are conventional as used in existing rotary gasoline engines, e.g., those powering Mazda RX-7 model vehicles.

Figure 13:
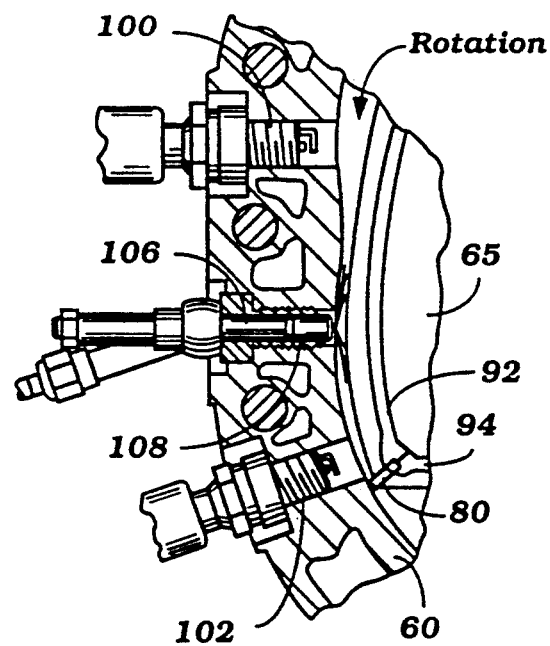
FIG. 13 is a cross section view of the pintle nozzle lateral fuel control along the riblets for accelerated fuel distribution over the rotor face to get a maximum distributed even pressure rise.

FIG. 13 is a cross section view of the trochoid rotor housing 60. Visible in this view are the dual ignition spark plugs 100 and 102 and the pintle type fuel injector nozzle 106. Laterally directed fuel atomizing orifices 111-114 in the spray tip 108 of the nozzle 106 provide a means for injecting the atomized fuel into the combustion chamber of the engine. (The nozzle 106 and spray tip 108 are shown in more detail in FIGS. 15-17.)

Figure 12:
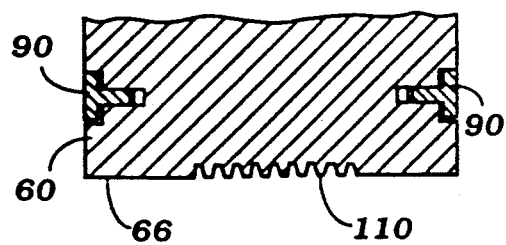
FIG. 12 is a rotor cross section view of the rotor aerodynamic riblets on line 12—12 of FIG. 7, to maintain laminar flow control and turbulent surface wetting and skin drag to get a complete volume stratified charge for more rapid and complete area pressure rise fuel burning.

As shown in the cross-sectional view of FIG. 12, a plurality of riblets 110 are formed in the combustion-side face 66 of the rotor 60. The riblets are microgrooves formed in the direction of rotation to be substantially parallel to the gas flow, and provide a means for aerodynamically laterally accelerating the fuel mixture on the combustion face 66 of the rotor 65 for full fuel stratification charge before firing. The riblets 110 in this embodiment are characterized by a cross-sectional "V" shape, about 0.005 inch deep and 0.005 inch wide. The riblets 110 are substantially parallel to the direction of rotation of the rotor 65. The riblets 110 guide the air-fuel mixture along the combustion face 66 of the rotor 65, and actually accelerates the mixture through a venturi acceleration phenomenon. This results in better stratification of the air-fuel mixture, and minimizes the surface wetting of the rotor face 66 prior to ignition of the mixture.

Riblets have been used in the past on boat hull surfaces and aircraft wing surfaces. See, e.g., "Riblets Reduce Flow Drag and Noise," Machine Design, Apr. 12, 1980, at pages 115-116. However, to applicant's knowledge, such riblets have not heretofore been employed in rotary engines to improve the fuel mixture stratification.

The fuel and pressure to the pintle injector nozzle 106 is timed by the cam driven rocker arm 114 (or by an electric solenoid). The pressure to the nozzle is developed by the injector pump 120. In this embodiment, the nozzle 106 is provided with a spray tip 108 having four orifices 111-114 through which the fuel is pumped under pressure and atomized.

The spray tip 108 of the nozzle 106 is shown in more detail in FIGS. 15-17. The spray tip 108 itself is of a conventional configuration used in diesel engines, e.g., manufactured by the Electro-Motive division of General Motors Corporation, except for the placement of the orifices 111-114. The orifices 111-114 are placed to direct the atomized fuel in the directions of the two spark plugs 100 and 102. Thus, the orifices 112 and 114 serve to direct the atomized fuel toward the spark plug 100 and the orifices 111 and 113 direct atomized fuel toward the plug 102.

The rocker arm 114 is driven by a camshaft (not shown) which is belt-driven in the conventional manner by a cogged timing belt driven by the crankshaft external to the engine housing. The arrangement employs a low pressure fuel pump to develop the fuel pressure to deliver the fuel to the injector 106. The injection system operates in many ways similar to the fuel injection systems used for many years in large diesel engines by manufacturers including General Motors Corporation. Thus, the system uses a rack gear for throttle positioning, which synchronizes both rotor fuel injection operations, in that the injection for one rotor combustion chamber is 180 degrees out of phase with the injection for the other rotor combustion chamber. As the fuel delivery is increased, the timing is automatically advanced, as the rack gear rotates and the metering plunger increases or decreases the metering point of the fuel injection. A difference between these conventional diesel engine injection systems and the system used on the engine described herein is that a pintle-type injector is employed rather than a ball-check type injector used in the diesel engines. Of course, the spark plugs are sparked under control of a distributor employing centrifugal advance, as is conventional in existing gasoline rotary Wankel-type engines.

An alternative approach is to employ a high pressure fuel pump to deliver fuel under pressure to an electronic solenoid which is selectively triggered to directly meter the fuel to the injector. Such an approach is believed preferable for some applications.

The system employs direct fuel injection into the combustion chamber. Improved fuel stratification is achieved. The riblets contribute to the stratification, as well as the placement of the orifices 111-114. The fuel mixture is virtually totally stratified before it is fired. Due to the placement of the spray tip orifices 111-114, the flame fronts proceed in both directions away from the injector nozzle tip, at the same time, resulting in maximum usage of the pressure buildup to maximize the crankage.

FIG. 13 illustrates the rotor 65 in a pre-firing position to show the direction fuel is injected by the pintle injector nozzle 106 mounted between the dual ignition spark plugs 102 and 104. It will be seen that two of the orifices direct the atomized spray therefrom toward spark plug 102 and the other two orifices direct the atomized spray therefrom toward spark plug 104.

FIG. 14 is a cross-sectional view taken through the engine housing 60 and illustrates the rotor 65, the spark plugs 100 and 102, the injector nozzle 106, and the rocker arm 114 driving the fuel pump 120. An air intake passageway 122 provides a means of intaking air into the operating chamber of the engine, either under atmospheric pressure or under increased pressure, as by turbocharging or supercharging. The toroidal operating chamber 55 of the engine is shown, and it will be apparent how the apex seal elements 80A and 80B will move relative to each other as the rotor 65 rotates within the chamber 55, maintaining contact with the wall of the chamber 55.

Referring again to FIGS. 1 and 2, features of the oil lubrication system employed in the engine system are illustrated. An oil passageway 140 is form at the axis of the crankshaft 50 and runs the length of the crankshaft 50. The main oil passageway 140 in turn communicates with side passageways 142 and 144 to feed oil to the roller bearing 70 and the rotor 65. An oil pump (not shown) pumps oil under pressure into the passageway 140. Use of the central oil passageway and an oil pump is itself known in the rotary engine art. See, e.g., "Advanced Stratified Charge Rotary Engine Design," R.E. Mount et al., International Congress and Exposition, Feb. 27-Mar. 3, 1989, SAE SP768, pages 1-12, FIG. 7. A plurality of openings 73 are formed in the bearing race 72 to allow oil to feed through the race 72 and into the open passage 146 formed in the engine housing, where the oil drains back to a sump for redistribution by the oil system pump. The engine includes water cooling to further cool the engine; water or other liquid coolant flows in various housing passages including exemplary passage 158 above the bulkhead 63 (FIG. 1).

Oil feeds through the rotor oil passageways 148 (there are three passageways per rotor—one for each lobe of the rotor) from the main oil passageway 140 to the rotor apex seals. The passageways 148 are approximately 1/16 inch in diameter. A small amount of oil flows through the passageways 148 to lubricate the apex seals 80 from the inside of the rotor. This provides a means for lubricating the sliding fit between the rotor seals and the rotor housing 60. This lubrication method for the seals contrasts with one conventional method to lubricate the apex seals by injecting oil into the air intake for the engine by a separate oil pump system. Such a conventional system resulted in poor lubrication results, carbon formation on the rotor face and engine housing, and increased pollution from oil combustion in the combustion chamber. With the present method of lubricating the apex seals, the need for a separate oil injection pump system is eliminated.

The rotary engine system described in this application is suitable for use in the aircraft propulsion system described in U.S. Pat. No. 4,446,695, entitled "Aircraft Propulsion Assembly". Thus, the engine system described herein may be employed as the prime mover B described in this patent.

It is understood that the above-described embodiments are merely illustrative of the possible specific embodiments which may represent principles of the present invention. Other arrangements may readily be devised in accordance with these principles by those skilled in the art without departing from the scope of the invention.

What is claimed is:

1. In a rotary engine comprising at least one rotor having at least one apex, said rotor for rotation within a toroidal engine operating chamber defined by an engine housing, the rotor having at least one combustion-side rotor face, an improved rotor characterized by a plurality of aerodynamic riblets defined in said combustion-side rotor face extending laterally substantially in the direction of rotation, said riblets reducing rotor surface wetting and improving lateral directing of atomized fuel before ignition.

2. The improved rotor of claim 1 wherein said riblets are characterized by s substantially V-shaped cross-sectional configuration.

3. The improved rotor of claim 1 wherein said rotor is further characterized by three rotor apexes, and by three combustion-side rotor faces extending substantially between respective pairs of said rotor apex, and further by a plurality of said riblets defined in each of said combustion-side faces and extending substantially in the direction of rotor rotation.

4. The improved rotor of claim 3 wherein the riblets extend from one apex to the adjacent apex along the rotor face.

5. The improved rotor of claim 1 wherein the riblets extend substantially perpendicularly to the apex.

6. The improved rotor of claim 1 wherein the riblets are of substantially equal width and depth and are less than one tenth of an inch in width and depth.

7. The improved rotor of claim 6 wherein the riblets have a width and depth of about 0.050 inches.

8. An improved rotary internal combustion engine, comprising:
an engine housing defining a toroidal-shaped inner chamber;
a crankshaft mounted for rotation within said housing;
an engine rotor having three apexes mounted for rotation within said inner chamber and coupled to said crankshaft to impart rotational energy thereto, said rotor comprising a combustion-side face extending between first and second apexes;
means for injecting atomized fuel into said inner chamber and drawing air into said chamber;
means for selectively igniting the air-fuel mixture within said inner chamber; and
a plurality of aerodynamic riblets defined in said rotor combustion-side face and extending laterally between said first and second rotor apexes, said riblets providing a means for accelerating the air-fuel mixture and directing the injected fuel laterally to provide improved stratified fuel charging before ignition of the fuel mixture.

9. The engine of claim 8 wherein said injecting means comprises an injector with a spray tip for injecting atomized fuel into said chamber, and said igniting means comprises two spark plugs having ignitor tips communicating with the toroidal chamber, said plugs being spatially separated and on opposite sides of said injector in respect to the axis of rotor rotation within said chamber to create two flame fronts extending in both directions from the injector.

10. The engine of claim 9 wherein said spray tip is characterized by at least two atomizing orifices, one of said orifices arranged to direct atomized fuel toward a first one of said spark plug ignitor tips, and a second one of said orifices arranged to direct atomized fuel toward a second one of said spark plug ignitor tips.

11. The engine of claim 10 wherein said spray tip is characterized by four atomizing orifices, two of said orifices arranged to direct atomized fuel toward a first one of said ignitor tips and the other two orifices arranged to direct atomized fuel toward a second one of said ignitor tip.

12. An improved rotary internal combustion engine comprising an engine housing defining a toroidal-shaped inner chamber with a pair of spaced apart internally extending lobes, an output shaft supported for rotation within said housing, a rotor having three apexes mounted for rotation within said inner chamber and coupled to said output shaft for driving said output shaft, said rotor defining combustion faces extending between said apexes, a fuel injector for injecting fuel into said inner chamber in proximity to one of said lobes and having a pair of spray orifices each directed toward a respective side of said lobe, and a pair of spark plugs positioned on opposite sides of said fuel injector and on opposite sides of said one lobe for firing a charge therein.

13. The engine of claim 12 wherein the fuel injector spray orifices each direct a spray toward a respective one of the spark plugs.

14. The engine of claim 13 wherein the fuel injector has two pairs of spray orifices with the orifices of each pair spraying one opposite sides of the respctive spark plug to initiate four flame fronts.

* * * * *